United States Patent
Farr et al.

[11] 3,746,284
[45] July 17, 1973

[54] CONTROL WHEEL STEERING DEVICE

[75] Inventors: Alton E. Farr, Rolling Hills; Graydon L. Welch, Artesia; Lorin A. Wood, Lakewood, all of Calif.

[73] Assignee: McDonnell Douglas Corporation, Santa Monica, Calif.

[22] Filed: Nov. 3, 1971

[21] Appl. No.: 195,238

[52] U.S. Cl. ............................ 244/83 E, 74/492
[51] Int. Cl. ............................................ B64c 13/04
[58] Field of Search .... 74/491–493; 244/75 R, 76 R, 74/77 R, 77 V, 83 E; 310/8, 8.5, 8.7, 9.1; 336/30

[56] References Cited
UNITED STATES PATENTS

| 3,653,612 | 4/1972 | Palfreyman | 244/83 E |
| 3,473,760 | 10/1969 | Vaiden | 244/83 E |
| 3,578,270 | 5/1971 | Ellis | 244/83 E |
| 3,057,585 | 10/1962 | Ziegler et al. | 244/83 E |
| 2,895,086 | 7/1959 | Pettit | 244/83 E X |
| 3,251,013 | 5/1966 | Klem et al. | 244/83 E X |

*Primary Examiner*—Milton Buchler
*Assistant Examiner*—Stephen G. Kunin
*Attorney*—Walter J. Jason, Robert O. Richardson et al.

[57] ABSTRACT

A control wheel steering device for manually applying override changes in aircraft attitude during autopilot control. Electrical signals fed to a flight guidance computer are varied by pilot pressure on a spring which deflects and in turn modulates an electronic transducer.

5 Claims, 7 Drawing Figures

PATENTED JUL 17 1973 3,746,284

INVENTORS
ALTON E. FARR
GRAYDON L. WELCH
LORIN A. WOOD
BY Robert O. Richardson
-ATTORNEY-

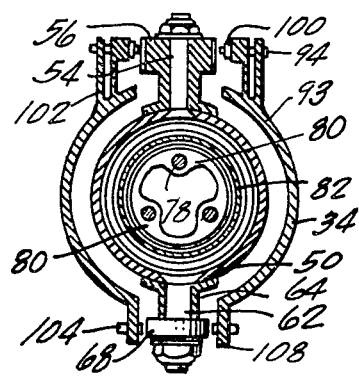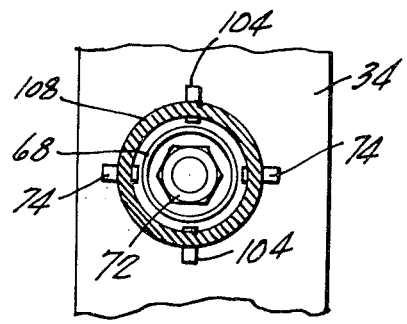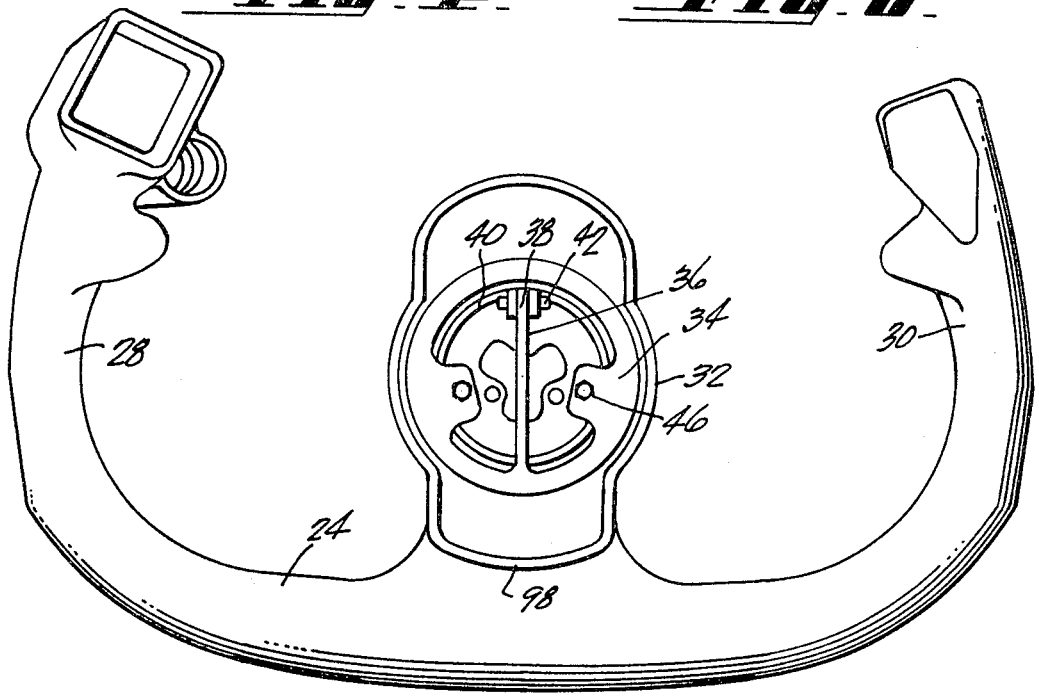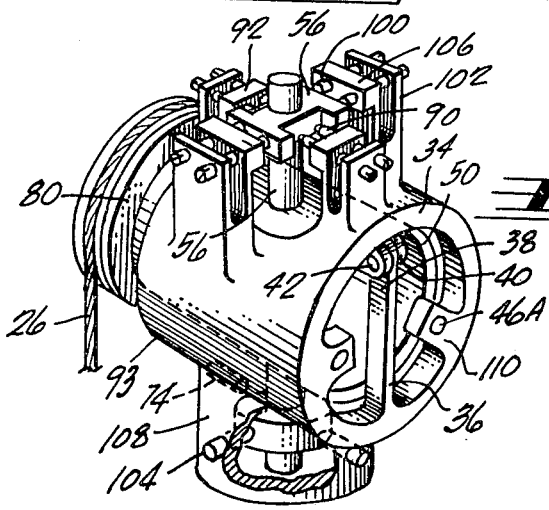

CONTROL WHEEL STEERING DEVICE

BACKGROUND OF THE PRESENT INVENTION

Today's commercial aircraft flies a substantial part of the time by autopilot control. The pilot sets certain controls and thereafter the autopilot causes the aircraft to fly at the attitude called for by the pilot's autopilot settings. Thus, takeoff, landing, cruise and other flight modes may be controlled automatically by the autopilot.

One of the pilot's controls is a control wheel steering device with which he changes roll or pitch attitude signals into the autopilot. The autopilot then sends signals to the surface actuators which move the ailerons and elevators accordingly.

The control wheel steering devices presently used generate electrical signals by rotating, bending or deflecting a member upon which may be mounted strain gage devices, transducers or other similar sensing devices that will vary a signal output as a function of the force applied to the member. Some devices, however, involved interaction between lateral and longitudinal control forces and this affected the accuracy of control. For example, a one-handed pull on the steering wheel rim would cause torsion as well as bending in the deflection member, thus causing inaccuracy in the sensor output. Instead of a simple change in pitch, a roll component also would be introduced. Electronically, this error can be cancelled out but this introduces additional undesirable system complexity.

SUMMARY OF THE PRESENT INVENTION

In accordance with the present invention the interaction between the pitch and roll forces are eliminated mechanically by the use of a bearing incorporating combined axial and radial freedom of movement of the control wheel within the bending beam deflection limits. In one embodiment a bending beam is mounted in the hub of the wheel and deflects in response to roll or pitch pilot force commands. As the beam bends, an air gap on a variable inductance sensor changes, thereby causing a change in electrical signal in an appropriate signal circuit. This circuit operates the autopilot computer which, in turn, causes an autopilot response.

The bearing between the control column and the wheel permits fore and aft movement (pitch) and turning movement of the wheel (roll) with respect to the column without interaction between the two movements. Thus, the bending beam, which connects the column to the wheel, is subjected only by the desired movement and deflects only in response to it. Accordingly, the electrical signals resulting from the deflection of the beam do not have interaction error that requires electrical cancellation and attendant complications.

The bending beam requires limit stops to prevent over-travel damage to the beam in both pitch and roll deflection. To prevent scrubbing on the stop contacts when pitch and roll are both introduced, a ball bearing is interposed between the bending beam and the control column.

BRIEF DESCRIPTION OF THE DRAWINGS

FIG. 3 is a vertical sectional view of the control column and wheel with interconnecting bending beam;

FIG. 4 is a sectional view of the roll sensors and limited stops taken along the line 4—4 of FIG. 3;

FIG. 5 is a plan view showing the sensor arrangement taken along the line 5—5 of FIG. 3;

FIG. 6 is a bottom view of the limit stop arrangement taken along the line 6—6 in FIG. 3; and FIG. 7 is a perspective view of the bending beam and associated mechanism.

DETAILED DESCRIPTION OF ILLUSTRATIVE EMBODIMENTS

Figure 1:
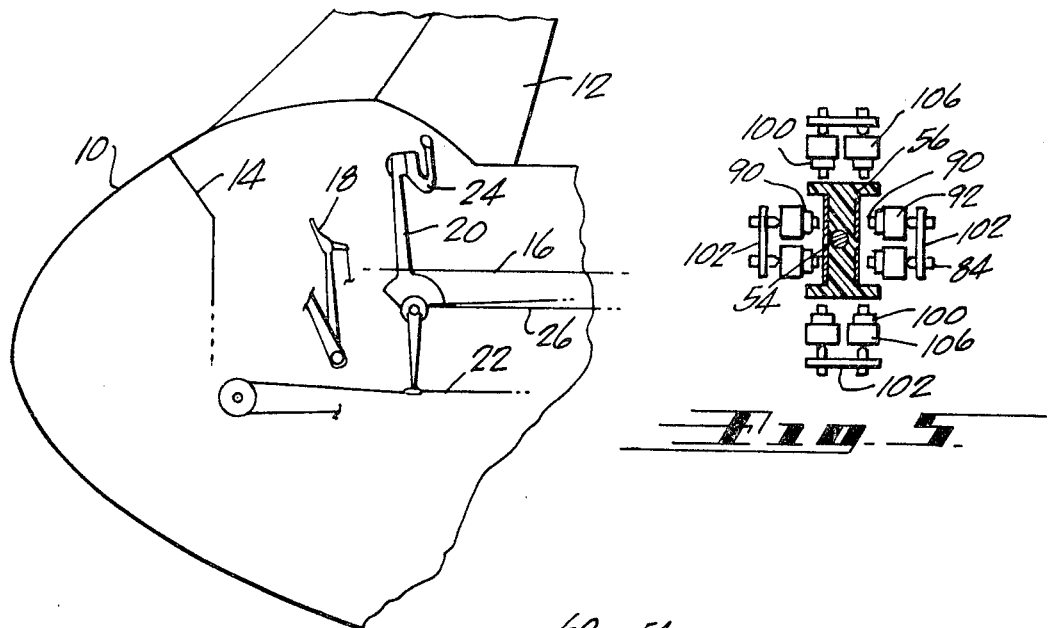
FIG. 1 is a schematic illustration showing a typical control steering column arrangement.

Referring now to the schematic illustration in FIG. 1 there is shown the nose 10 of an airplane having a pilot's window 12, instrument panel 14 and cabin floor 16. Extending through the floor are the rudder pedals 18 and pivotal control column 20. This column is movable fore and aft to move the elevator control cables 22. A control wheel 24 is mounted on the control column 20 and its rotation causes movement of the aileron control cables 26. In its most simple form, a fore and aft movement on the control wheel 24 moves the elevators for pitch movement and rotation of the control wheel 24 causes rolling movement through the aileron cables. In larger aircraft, the steering wheel movements cause electrical signals to be applied to the autopilot which then change the control surface positions through the autopilot control system. This, in turn, moves the elevator and aileron cables and control surfaces.

Figure 2:
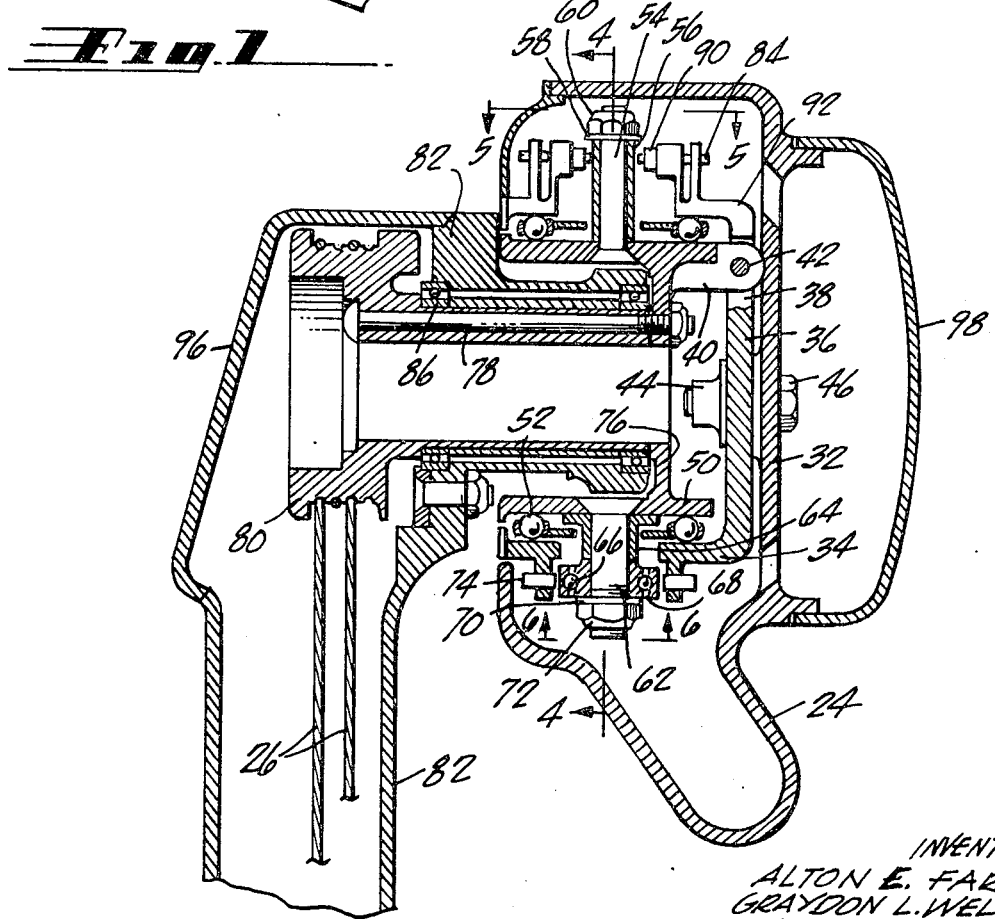
FIG. 2 is a pilot's view of the control wheel with the cover removed to show the bending beam arrangement.

In FIG. 2 there is shown a pilot's view of the control wheel 24 having a lefthand grip 28 and a righthand grip 30 by which the control wheel is rotated or moved fore and aft. The control wheel has a hub section 32. Within the hub section 32 of the rotatable control wheel 24 is a spring beam support member 34 including a spring beam element 36 integrally affixed at one end thereto. Spring beam element 36 has a free end 38 pivotally connected to a sensor sleeve 40 through pivot 42. Rotation of wheel 24 is transmitted to the sensor sleeve 40 through the spring beam element 36 to permit minor relative movement between the sensor sleeve 40 and the spring beam support member 34.

Reference is now made to FIG. 3 wherein the control wheel 24 is shown in section with its hub section 32 connected to spring beam element 36 through the spring beam suport member 34. Nut plate 44 and bolt 46 shown in FIG. 2 and FIG. 3 make this a removable connection. The spring beam support member 34 incorporates a cylindrical shape that becomes the inner race 50 for ball bearing 52. As will hereinafter be explained, this bearing permits axial and radial movement of the sensors within limits of the stop screw settings 74 and 104.

Extending through race 50 is a bolt 54 over which is positioned a sensor post 56 fastened thereover by means of a washer 58 and nut 60. This sensor post 56 will be more fully described in reference to FIG. 5 hereinafter. Extending downwardly from inner race 50 is another bolt 62 over which is positioned a sleeve 64 having ball bearing 66 and an outer ring 68 at the outer end thereof. This sleeve 64 is maintained over bolt 62 by means of washer 70 and nut 72. Mounted on the spring beam support member 34 on opposite sides of the bearing outer ring 68 are pitch stop adjustable screws 74 to provide limit stops. Spaced 90° from the pitch override members are roll over-ride members, not shown.

Extending radially inwardly from inner race 50 is a collar 76 through which bolts 78 are inserted to connect this structure with the control drum 80. This control drum is rotatably mounted within control post housing 82. Cables 26 on cable drum 80 are connected to the aileron actuators of the aircraft for roll control.

Mounted fore and aft of the sensor post 56 are pitch sensors 90 which are mounted to spring beam support member 34 by means of sensor support 92. Sensor support 92 also is a part of a member that forms the outer race for ball bearing 52. Set screws 84 may be used to adjust the fore and aft spacing of the pitch sensors 90 relative to a preselected neutral position of sensor post 56.

Although not obvious until further description with references to other drawings has been made, the fore and aft movement of control wheel 24 results in a flexure of spring element 36 with a resulting fore and aft movement of the pitch sensors 90 relative to the sensor post 56. One form of sensor utilizes the air gap between the sensor post 56 and the pitch sensors 90 and its variation varies the inductance in an appropriate electronic circuit to generate a signal proportional to the change in spacing between the two.

Access to the rear of the control column 82 may be had through a removable rear cover 96. Removable cover 98 at the front permits access to, and removal of, the control wheel 24, the spring beam support member 34 and bolts 78. This permits the removal of the complete sensor and stop assembly.

Reference is now made to FIG. 4 which is a vertical sectional view taken along the line 4—4 of FIG. 3. This section shows the roll sensors 100 and roll limit stops 104. Here there is shown the sensor body 93 which extends around and is spaced from the inner race 50 to accommodate bearings 52, shown in FIG. 3. This inner race 50, in turn, is fastened to cable drum assembly 80 by bolt 78. A sleeve portion of housing 82 fits between. Both inner race 50 and cable drum assembly 80 rotate relative to this sleeve portion. Bolt 54 and sensor post 56 extend upwardly from inner race 50 and moves toward and away from roll sensors 100 as spring beam element 36 is rotated in response to rotation of control wheel 24.

Bolt 62 with sleeve 64 with bearing outer ring 68 extend downwardly from the lowermost surface of race 50. Ring 68 is positioned between roll limit stops 104 which are screws adjustably mounted on the stop ring 108. This stop ring 108 extends downwardly from spring beam support member 34.

A plan view showing the relationship of the pitch and roll sensors with the sensor post is shown in FIG. 5. Here the pitch sensors 90 are shown supported by sensor supports 92 spaced on either side of sensor post 56 and their spacing is adjusted by means of set screws 84 in adjustment supports 102. Similarly, the roll sensors 100 are mounted on sensor supports 106. Thus, movement of bolt 54 and sensor post 56 in a fore and aft, or pitch direction, or in a side or rolling direction, will be sensed by its proximity to the various transducers. As can be determined by inspection of the various views, the sensors 90, 100 also move with movement of the control wheel 24 whereas sensor post 56 is stationary with respect to control drum 80.

The structure in FIG. 6 is the limit stop arrangement for providing contact between the adjustable limit stops 74 and 104, which are movable with the control wheel 24. The post ring 68 is stationary with respect to the control drum 80. When the force on the wheel in either pitch or roll reaches the pre-set wheel deflection the adjustment stops 74, 104 will contact ring 68. Further increased force is transmitted to post 62 thereby limiting signal output of sensors. This also provides manual override capability to the autopilot.

The control assembly can be seen in the perspective view shown in FIG. 7. The sensor body 93 is cylindrical in shape and has an opening in the top through which sensor post 56 protrudes. Outwardly from the opening and spaced 90° apart are the sensor supports 92 and 106. Ring 108 with limit stop members 74 and 104 extends below. Sensor body 93 has a front face which is spring beam support member 34. On this support member are protrusions 110 having apertures 46A for insertion of mounting bolts 46 for mounting of the control wheel 24. Inner race member 50 of bearing 52 is seen within the main sensor body 93. Its inward extension becomes the inner race from which sensor post 56 extends and on which bearing 52 moves both circumferentially and fore and aft. Cable drum 80, over which is positioned aileron cable 26, extends rearwardly from the sensor support body 93.

Having thus described one illustrative embodiment of the present invention, it is to be understood that other forms will become obvious to those skilled in the art and that these modifications are to be considered as part of the present invention as claimed.

We claim:

1. A control wheel steering device for manually applying override changes in aircraft attitude during autopilot control comprising:
   a control wheel attached to a spring beam support member having a spring beam element thereon,
   said spring beam element being attached at one end to a sensor sleeve,
   said sensor sleeve being connected to a control cable drum for rotation thereof in response to rotational movement of said control wheel and rotational deflection of said spring beam element ,
   said spring beam support member being longitudinally movable over said sensor sleeve in response to fore and aft movement of said control wheel and fore and aft deflection of said spring beam element, and
   sensing means to determine the bending movement of said spring beam element,
   said sensing means including a sensor contact post extending radially outwardly from said sensor sleeve and through said spring beam support member,
   said spring beam support member having a plurality of sensor supports with sensors thereon spaced about said sensor contact post,
   said sensors indicating the spacing of said sensor contact post therefrom and thus the bending movement of said spring beam element.

2. A control wheel steering device as in claim 1, and stop means limiting rotational and fore and aft movement of said spring beam support member over said sensor sleeve,
   said stop means including a post extending radially outwardly from said sensor sleeve and through an opening in said spring beam support member, said post contacting the body wall of said opening limiting said movements.

3. A control wheel steering device as in claim 2 wherein said opening has a ring thereover with adjustment limit stops therein, said post having a roller contact thereon for contacting said limit stops in limiting said movements.

4. A control wheel steering device as in claim 1 wherein said sensor supports have an adjustable positioning means for initially adjusting the position of said sensors relative to a predetermined position of said sensor contact post.

5. A control wheel steering device as in claim 1 wherein said spring beam support member forms an outer race and said sensor sleeve forms an inner race, and ball bearings between said races permitting rotational and longitudinal movement therebetween, a sleeve containing said ball bearings in a double row between said races to prevent twisting movement between said spring beam support member and said sensor sleeve.

* * * * *